July 28, 1936.　　　E. W. JOHNSON　　　2,049,121
TRAP NEST
Filed May 31, 1935　　　3 Sheets-Sheet 1

Inventor
E. W. Johnson
By Clarence A. O'Brien
Attorney

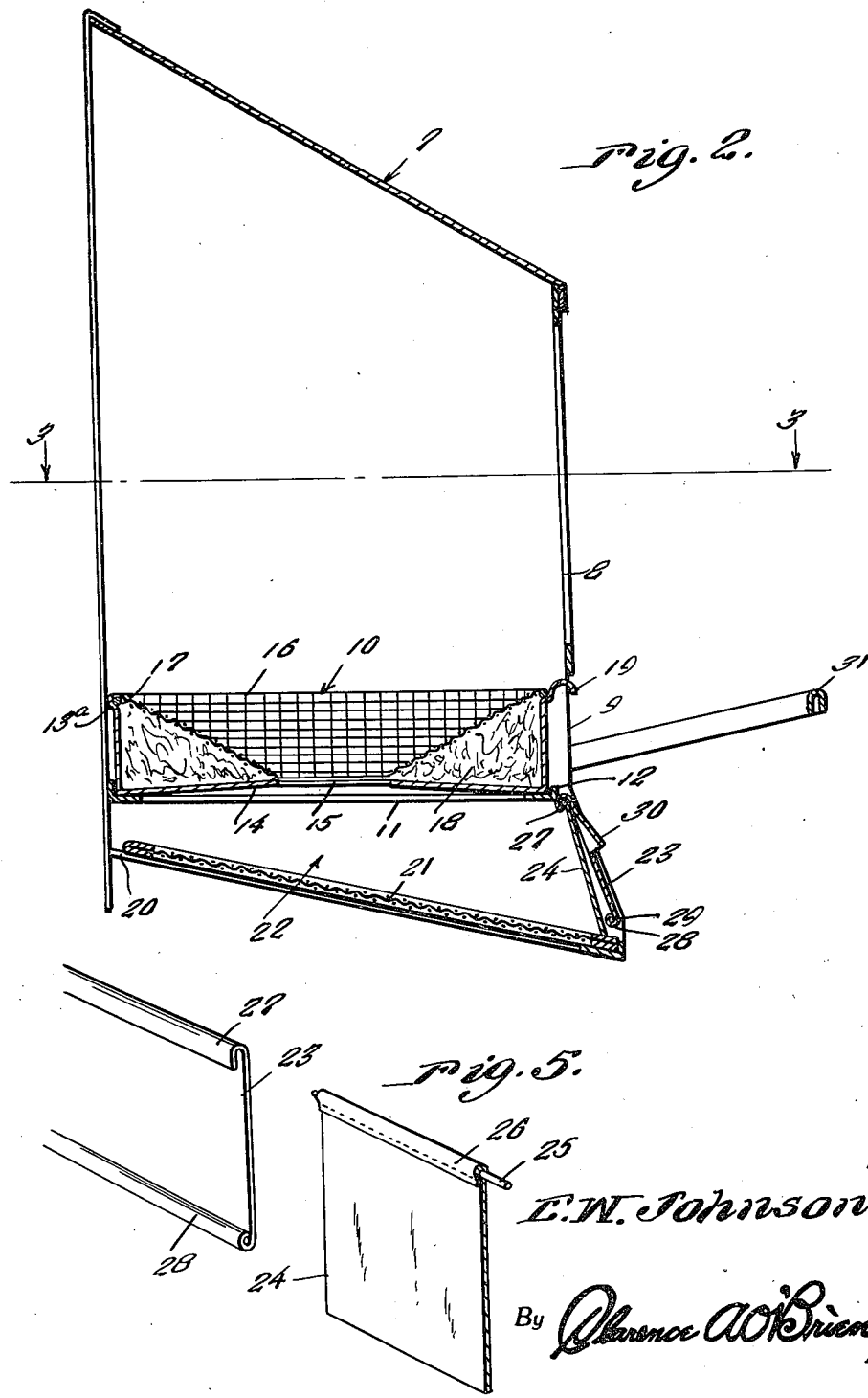

July 28, 1936. E. W. JOHNSON 2,049,121
TRAP NEST
Filed May 31, 1935 3 Sheets-Sheet 3
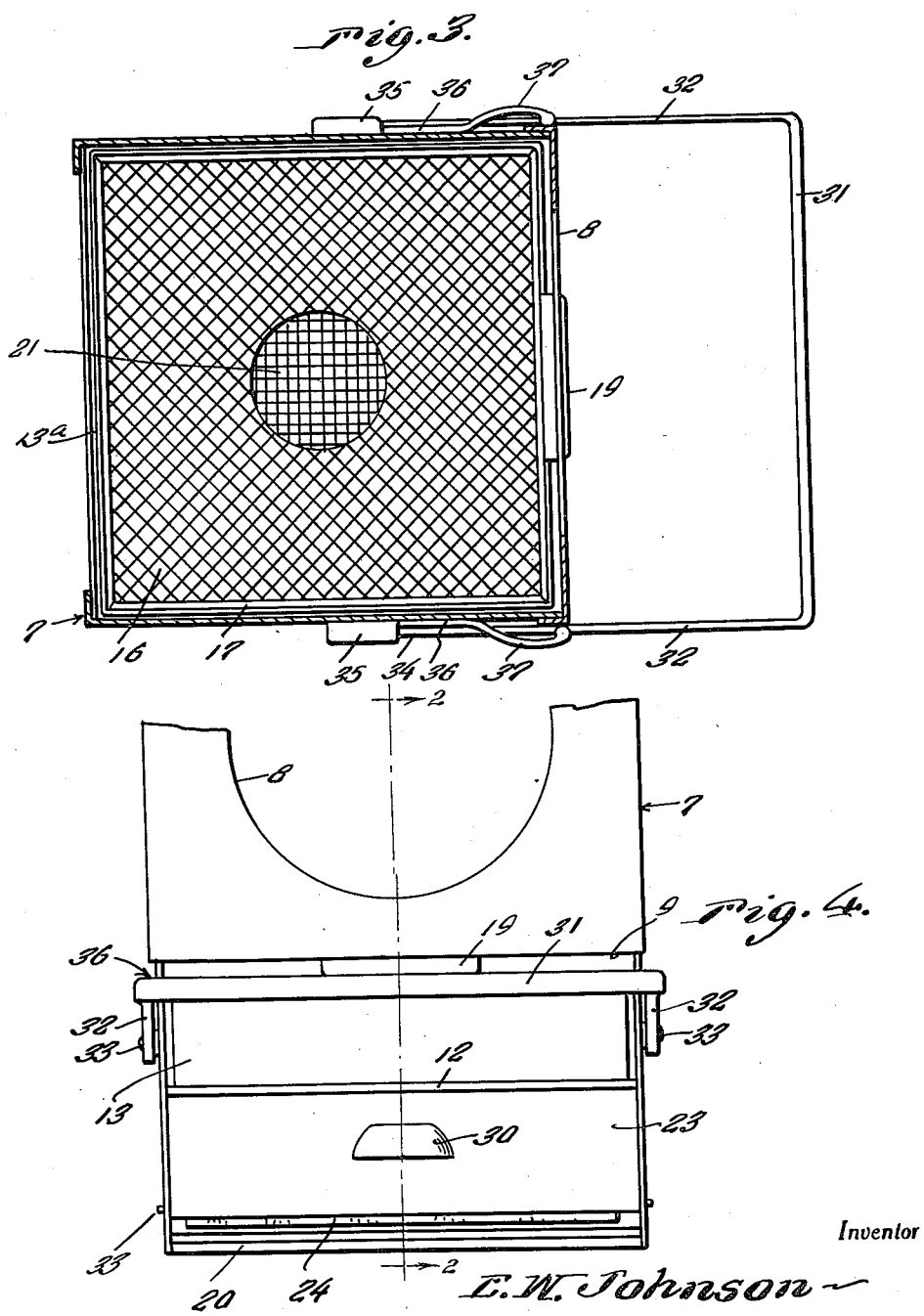
Inventor
E. W. Johnson
By Clarence A. O'Brien
Attorney Patented July 28, 1936

2,049,121

UNITED STATES PATENT OFFICE 2,049,121

TRAP NEST

Elmer W. Johnson, Alexandria, Minn.

Application May 31, 1935, Serial No. 24,401

4 Claims. (Cl. 119—48)

This invention relates to a novel and improved trap nest of the type designed for safely and satisfactorily trapping eggs layed by chickens, and especially to one which embodies a feasible and dependable trapping compartment designed to facilitate handling and collection of the eggs.

Although the principle may be involved in a multiple or series type nest structure, I have herein shown the same as developed for use in a single or unitary trap nest, this being thought to be sufficient to portray the idea and enable a clear understanding of the invention to be had.

In perfecting a structure susceptible of fulfilling my requirements, and developing one which may be adequately endorsed by the trade, I have found it expedient and practicable to adopt and use a suitable enclosure or housing and to provide this with special accessories and means forming the features and improvements desired.

Needless to say, I am aware that there are various types of trap nests and innumerable ways and means have been utilized to promote safe trapping and collecting of eggs and to entice unrestricted laying by the chickens. It follows, therefore, that it is my primary aim to provide a structure which is characterized by noteworthy refinements and practical developments which, collectively speaking, promote efficiency and economy.

The structural features and advantages to be stressed will become readily apparent from the drawings and accompanying explanatory matter and will be emphasized in the summary preceding the claims.

In the accompanying drawings wherein like numerals are employed to designate like parts throughout the views:

Figure 2 is a substantially central vertical sectional view complete in character which is taken substantially on the plane of the line 2—2 of Figure 4.

Figure 3 is a horizontal section taken on the plane of the line 3—3 of Figure 2 looking downwardly in the direction of the arrows.

Figure 4 is a fragmentary front view of the lower trap portion of the structure.

Figure 5 is a perspective group showing of the two-part trap or door closure.

Figures 1, 6:
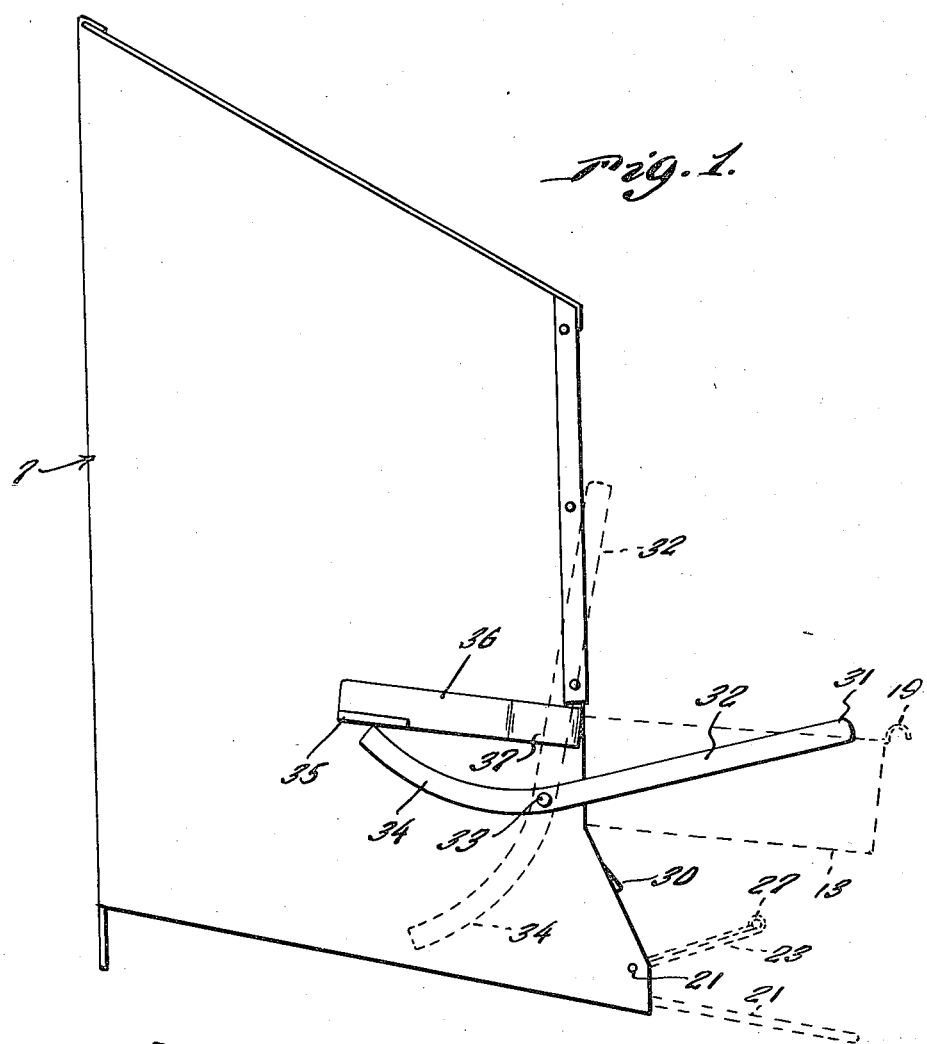
Figure 1 is a side elevational view showing the preferred embodiment of the invention, disclosing the normal position of the parts in full lines, and additional positions of the parts in dotted lines.
Figure 6 is a perspective drawing of the pan-like receptacle forming the primary part of the nest per se.

In the drawings the housing or enclosure, which is generally of sheet metal or the like, is denoted by the numeral 7 and is of any appropriate proportions and designs to adapt it for in and out-of-doors use. It has an inclined top and is more or less completely open at its bottom when the removable parts are removed. The front wall is formed with a suitable entrance opening 8. There is a slot 9 to facilitate insertion and removal of the drawer-like nest 10. This nest unit is slidably mounted on a track or frame 11 having an upstanding flange at 12 to serve as a keeper. The drawer is slidable through the slot 9 as is evident. Inasmuch as the nest is of a particular construction I call attention to Figure 6 wherein it will be observed that the receptacle or pan 13 is of an easily cleanable sheet metal type. It is of general rectangular form and has an outstanding L-shaped ledge or rim 13a around the top. The bottom, which is of segmental form is indicated at 14 is slightly concavo-convex and has an opening at 15. As a matter of fact, the bottom may be said to be of a slightly truncated conical or pyramidal form. This is for the purpose of trapping dirt and accumulations surrounding the marginal portion of the interior thereof so that when the drawer is pulled out it can be dumped and cleaned expeditiously. A suitable mesh screen or grid 16 forms a part of the nest and this is of tapered or dished formation with its discharge opening at the center matching the opening 15 to allow the eggs to arop therethrough. The screen has a marginal reinforcing frame 17 which is removably seated in the ledge or rim 13. In effect the screen is a sort of cover for the filler material 18. This is of appropriate cushioning properties such as will provide the desired seat for the hen. Or stated otherwise, by putting this packing material 18 between the concavo-convex bottom 14 of the pan and the reversedly shaped screen 16 a comfortable nest possessing the natural nesting properties is provided. At the same time, the nest can be pulled out by way of the finger piece 19 and through the slot 9 as shown in dotted lines in Figure 1 to allow the packing 18 to be changed from time to time to permit the screen and pan to be cleansed and then reassembled and put back in place.

Next I call attention to the open bottom construction which includes an integral frame 20 of an inclined type which serves as a support for the trap bottom 21. Incidentally the space between the part 21 and the nest forms the trapping chamber in which the eggs (not shown) are successively collected. In order that the eggs may not be broken or damaged during the downward movement through the discharge opening in the trap the screen bottom 21 is of proper compensating resilient properties.

The trap door at the discharge end of the trap 21 may be said to be made up principally of two parts; namely, the hinged cover plate 23 and the removable flexible flap or shield 24. The shield simply has one edge stitched or wrapped around a hinge rod 25 as indicated at the point 26. Then the hooked flange 27 on the upper edge of the plate 23 is hooked loosely over the wrapping 26. Or stated otherwise, the shield, which is primarily a protector to prevent breaking of the eggs if they roll down the chute-like incline 21 rapidly, is attached to the rod 25 and the rod is bent or otherwise detachably fastened in the hooked flange 27 to complete the assembly. The rolled knuckle 28 on the lower edge of the plate 23 is suitably hinged in place to swing outwardly and downwardly as indicated at 29. The numeral 30 is merely a suitably fashioned struck-out hand grip on the door. It will be noted that there is enough clearance between the supporting frame or ledge 20 and the hinge 29 to allow the screen bottom 21 to be slipped out as shown in dotted lines in Figure 1 for brushing and cleaning. By employing this screened bottom effect in the trapping chamber, the circulation of air has a tendency to prevent the hen from nesting too long. The chief idea, however, is to provide a comfortable nest having a discharge opening above the trapping chamber 22 through which the eggs pass and are collected in the chamber 22 to be removed by way of the trap door 23.

I now call attention to the roost. This comprises a U-shaped frame whose bight portion 31 constitutes the perch and whose arm portions 32 are hingedly attached to the side walls of the trap box or casing as indicated at 33. The extreme inner ends of the arms are curved as at 34 to serve as stop elements. These cooperate with stop flanges 35 formed on the brackets 36 secured to the opposite side walls of the casing. The free ends of the brackets are formed into spring clips or retaining hooks 37 which are in effect keepers.

These keeper-equipped brackets 36 serve in the first place as stops to hold the roost or perch in proper position in relation to the entrance opening 8, that is when it is in full lines as illustrated in Figure 1. The clips 37 come into play to allow the roost to swing up to the dotted line position in which position it is held so that the cross bar or perch 31 extends across the opening 8 and serves as a sort of closure to prevent the entrance of chickens. This is generally swung up into place at night or other periods when the nest is to be out of use. Incidentally, the stop elements 34 and 35 are such that the bar 31 remains in elevation in relation to the slot 9 as to allow the drawer 10 to be slipped in and out of place without interference and without necessarily swinging the roost up to the dotted line position shown in Figure 1.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having thus described the invention, what is claimed as new is:

1. In a trap nest of the class described, a housing provided with trap and nest means, the front wall thereof having an entrance opening leading to the nest, a substantially U-shaped roost including a perch and attaching arms, said attaching arms being hingedly attached to said housing, brackets secured to said housing and provided with stop elements with which the free ends of said arms are engageable, said brackets being formed at their outer ends with resilient clips engageable with the arms of the roost to hold the roost in an upwardly disposed position and in relation to the entrance opening so that the perch bar extends across said opening to function as a temporary closure for the housing.

2. In a structure of the class described, a housing, a nest supported in said housing, that portion of the housing beneath said nest being fashioned to provide an egg trapping chamber, said chamber having a discharge opening and a closure for said opening, said closure comprising an outwardly and downwardly swingable door hingedly mounted at its bottom, the upper edge of said door being provided with a hooked flange, a rod member clenched in said flange, and a flexible shielding flap attached to said rod member and separate from the door, said flap being of an area substantially equal to the door to serve in the manner and for the purposes described.

3. A trap nest comprising an inclosure open at its bottom, formed in its front wall with a nest accommodation slot, and above said slot with an entrance and exit opening, a removable openwork bottom-forming unit slidably mounted in the lower portion of said inclosure, a nest rack in the inclosure above said openwork bottom, a nest slidably mounted on said rack and insertable and projectable in said slot, and a downwardly and outwardly swingable door mounted in the frontal portion of said inclosure between said openwork bottom and nest, said door being hingedly supported at its bottom and the hinging means being spaced above the adjacent edge of said openwork bottom to permit the bottom to be slid out for convenient brushing and cleaning purposes.

4. In a trap nest construction of the class described, a housing provided with a trapping and nest means, the front wall of said housing being provided above the nest means with an entrance opening permitting entry to be had to said nest, a substantially U-shaped roost including a perch and attaching arms, said arms being pivotally connected to the side walls of the housing at points intermediate their ends to dispose the perch normally on a plane below said entrance opening, and a fixture secured to one side wall and provided with a stop element cooperable with the free end of one of said arms to limit the downward swinging movement of the perch, said fixture being provided with a spring clip engageable with said arm when the roost is swung up to an out-of-the-way non-roosting position to serve as a temporary guard and closure for said entrance opening.

ELMER W. JOHNSON.